United States Patent
Li et al.

(10) Patent No.: US 11,189,194 B2
(45) Date of Patent: Nov. 30, 2021

(54) DISPLAY PANEL, DISPLAY DEVICE AND METHOD FOR DISPLAYING BRAILLE INFORMATION

(71) Applicant: BOE TECHNOLOGY GROUP CO., LTD., Beijing (CN)

(72) Inventors: Changfeng Li, Beijing (CN); Haisheng Wang, Beijing (CN); Yingming Liu, Beijing (CN); Xiaoliang Ding, Beijing (CN); Rui Xu, Beijing (CN); Pengpeng Wang, Beijing (CN); Wei Liu, Beijing (CN); Yuzhen Guo, Beijing (CN); Pengcheng Lu, Beijing (CN); Yanan Jia, Beijing (CN); Pinchao Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 627 days.

(21) Appl. No.: 16/080,618

(22) PCT Filed: Feb. 2, 2018

(86) PCT No.: PCT/CN2018/075030
§ 371 (c)(1),
(2) Date: Aug. 28, 2018

(87) PCT Pub. No.: WO2019/007051
PCT Pub. Date: Jan. 10, 2019

(65) Prior Publication Data
US 2021/0183264 A1    Jun. 17, 2021

(30) Foreign Application Priority Data

Jul. 3, 2017 (CN) .......................... 201710534760.4

(51) Int. Cl.
*G09B 21/00* (2006.01)
*G09G 3/00* (2006.01)

(52) U.S. Cl.
CPC ......... *G09B 21/004* (2013.01); *G09B 21/007* (2013.01); *G09G 3/03* (2020.08);
(Continued)

(58) Field of Classification Search
CPC .. G09B 21/004; G09B 21/007; G09B 21/003; G09G 3/03; G09G 2310/0267;
(Continued)

(56) References Cited

U.S. PATENT DOCUMENTS

2007/0020589 A1    1/2007  Smith et al.
2009/0033617 A1*   2/2009  Lindberg .......... H04M 1/72403
                                                              345/156
(Continued)

FOREIGN PATENT DOCUMENTS

CN        2410688 Y      12/2000
CN      101261775 A       9/2008
(Continued)

OTHER PUBLICATIONS

PCT International Search Report, Application No. PCT/CN2018/075030, dated Apr. 17, 2018, 5 pages: with English translation.
(Continued)

*Primary Examiner* — Richard J Hong
(74) *Attorney, Agent, or Firm* — Armstrong Teasdale LLP

(57) ABSTRACT

The embodiments of the present disclosure provide a display panel, a display device, and a method for displaying Braille information. The display panel includes a plurality of scan lines, data lines, and display circuits arranged at intersections of the plurality of scan lines and the plurality of data lines. The display circuit includes a switch configured to be turned on or off according to a scan signal from the scan line,
(Continued)

and a dot element coupled to the switch. The dot element includes a substrate, an electrode provided on the substrate, a thermosensitive layer provided on the electrode, and a dot key arranged on the thermosensitive layer. The electrode is coupled to the switch, and configured to be applied with a data signal from the data line when the switch is turned on. The thermosensitive layer is configured to be heated by the electrode to protrude the dot.

18 Claims, 4 Drawing Sheets

(52) U.S. Cl.
CPC ............... *G09G 2310/0267* (2013.01); *G09G 2310/0275* (2013.01); *G09G 2310/08* (2013.01)

(58) Field of Classification Search
CPC ........ G09G 2310/0275; G09G 2310/08; A63F 13/26; G06F 3/011; G06F 3/016; G06F 3/0488; G06F 3/04886; H04M 1/72403
See application file for complete search history.

(56) References Cited

U.S. PATENT DOCUMENTS

| | | | |
|---|---|---|---|
| 2010/0182245 A1* | 7/2010 | Edwards | G06F 3/04886 345/173 |
| 2012/0050172 A1* | 3/2012 | Wong | G06F 3/011 345/173 |
| 2013/0029297 A1* | 1/2013 | Tsai | G09B 21/003 434/114 |
| 2015/0302772 A1* | 10/2015 | Yu | G06F 3/0488 345/173 |
| 2016/0018890 A1* | 1/2016 | Deokar | G06F 3/016 715/702 |
| 2018/0214779 A1* | 8/2018 | Tran | A63F 13/26 |

FOREIGN PATENT DOCUMENTS

| | | | |
|---|---|---|---|
| CN | 201213279 Y | | 3/2009 |
| CN | 102654948 A | | 9/2012 |
| CN | 103442116 A | | 12/2013 |
| CN | 104517505 A | | 4/2015 |
| CN | 105930014 A | * | 9/2016 |
| CN | 105930014 A | | 9/2016 |
| CN | 107067893 A | | 8/2017 |
| JP | 2015145965 A | | 8/2015 |
| KR | 20130042675 A | | 4/2013 |

OTHER PUBLICATIONS

PCT Written Opinion, Application No. PCT/CN2018/075030, dated Apr. 17, 2018, 6 pages.: with English translation of relevant part.
China First Office Action, Application No. 201710534760.4, dated Dec. 24, 2018, 25 pps.: with English translation.

* cited by examiner

DISPLAY PANEL, DISPLAY DEVICE AND METHOD FOR DISPLAYING BRAILLE INFORMATION

CROSS REFERENCE TO RELATED APPLICATIONS

This patent application is a National Stage Entry of PCT/CN2018/075030 filed on Feb. 2, 2018, which claims the benefit and priority of Chinese Patent Application No. 201710534760.4 filed on Jul. 3, 2017, the disclosures of which are incorporated herein by reference in their entirety as part of the present application.

BACKGROUND

The present disclosure relates to the field of display techniques, and particularly, to a display panel, a display device and a method for displaying Braille information.

Due to inherent visual defects, blind people can only acquire the outside information through sound and touch. Thus, when a blind person is reading, he usually acquires the text of the information by touching the Braille information with a hand. In the traditional techniques, protruded dots are generally prepared on paper to enable a blind person to touch the Braille information. But in this way, the paper with the protruded dots cannot be reused any more, which causes serious waste of resources.

In that case, a Braille information display device for displaying the Braille information emerges at the right moment. In the existing Braille information display devices, the Braille information is usually displayed by employing a mechanical control mode, such as using the piezoelectric patches. However, this control mode has a complicated structure and a cumbersome process, and it is difficult to realize a fine control of braille dots.

BRIEF DESCRIPTION

The embodiments of the present disclosure provide a display panel, a display device, and a method for displaying Braille information.

A first aspect of the present disclosure provides a display panel, including a plurality of scan lines, a plurality of data lines, and a plurality of display circuits arranged at intersections of the plurality of scan lines and the plurality of data lines, respectively, wherein the display circuit includes a switch configured to be turned on or off according to a scan signal from the scan line, and a dot element coupled to the switch, wherein the dot element includes a substrate, an electrode provided on the substrate, a thermosensitive layer provided on the electrode, and a dot key arranged on the thermosensitive layer, wherein the electrode is coupled to the switch, and configured to be applied with a data signal from the data line when the switch is turned on, and wherein the thermosensitive layer is configured to be heated by the electrode to protrude the dot key.

In the embodiment of the present disclosure, the thermosensitive layer is made of a thermosensitive material.

In the embodiment of the present disclosure, the dot element further includes a protection layer arranged between the thermosensitive layer and the dot key.

In the embodiment of the present disclosure, the protection layer is made of a resin material.

In the embodiment of the present disclosure, the plurality of display circuits is arranged in a matrix.

In the embodiment of the present disclosure, the switch includes a thin film transistor (TFT), wherein a control electrode of the TFT is coupled to the scan line, a first electrode of the TFT is coupled to the data line, and a second electrode of the TFT is coupled to the electrode.

A second aspect of the present disclosure provides a display device, including a display panel according to the first aspect of the present disclosure, an information recognition unit configured to recognize input information to generate text information, and a control unit coupled to the information recognition unit and the display panel, and configured to convert the text information into Braille information, to generate a drive signal for the display panel based on the Braille information, and to provide the drive signal to the display panel, wherein the display panel is configured to display the Braille information according to the drive signal.

In the embodiment of the present disclosure, the control unit includes a conversion module coupled to the information recognition unit, and configured to convert the text information into Braille information, to determine a display circuit of the display panel in which the corresponding dot key is to be protruded based on the Braille information, and to generate a first control instruction and a second control instruction, a timing control circuit coupled to the conversion module and the display panel, and configured to generate a scan signal according to the first control instruction and to provide the scan signal to the corresponding scan line of the display panel, and a data drive circuit coupled to the conversion module and the display panel, and configured to generate a data signal according to the second control instruction and to provide the data signal to the corresponding data line of the display panel.

In the embodiment of the present disclosure, the information recognition unit includes at least one of an image recognition element and a voice recognition element.

A third aspect of the present disclosure provides a method for displaying the Braille information in a display device according to the second aspect of the present disclosure, including recognizing input information to generate text information, converting the text information into the Braille information, generating a drive signal for a display panel in the display device according to the Braille information, and driving the display panel to display the Braille information according to the drive signal.

In the embodiment of the present disclosure, generating a drive signal based on the Braille information includes determining a display circuit of the display panel in which the corresponding dot key is to be protruded based on the Braille information, generating a first control instruction and a second control instruction according to the determined display circuit, and generating a scan signal and a data signal for the display panel respectively according to the first control instruction and the second control instruction.

In the embodiment of the present disclosure, the input information includes at least one of image information and voice information.

BRIEF DESCRIPTION OF THE DRAWINGS

In order to more clearly describe the technical solutions in the embodiments of the present disclosure or in the prior art, the drawings to be used in the embodiments of the present disclosure or the prior art will be briefly introduced as follows. Obviously, the drawings in the following description just illustrate some embodiments of the present disclosure, and a person skilled in the art can obtain other drawings from them without paying any creative effort.

DETAILED DESCRIPTION

Figure 1:
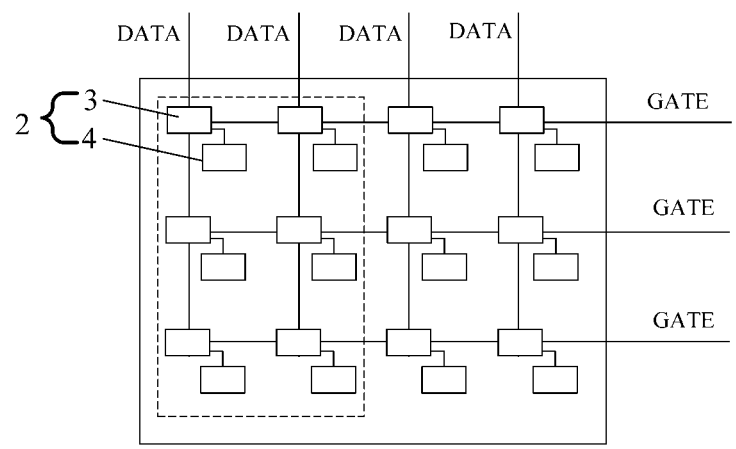
FIG. 1 illustrates a structural schematic diagram of a display panel according to an embodiment of the present disclosure.

In order to make the characteristics and advantages of the embodiments of the present disclosure more apparent and understandable, the technical solutions of the embodiments of the present disclosure will be clearly and completely described as follows with reference to the drawings of the embodiments of the present disclosure. Obviously, the embodiments described are just a part of the embodiments of the present disclosure rather than all of the embodiments. Based on the embodiments of the present disclosure, any other embodiment obtained by a person skilled in the art without paying any creative effort shall fall within the protection scope of the present disclosure.

It should be noted that, in the drawings referred to the following embodiments, the specific number of the display circuits included in the illustrated display panel, as well as the specific numbers of the switches, and the dot elements included in each display circuit are merely illustrative, rather than limitations to the respective actual numbers.

FIG. 1 illustrates a structural schematic diagram of a display panel according to an embodiment of the present disclosure. As illustrated in FIG. 1, the display panel includes a plurality of scan lines GATE, a plurality of data lines DATA, and a plurality of display circuits 2 arranged at intersections of the plurality of scan lines GATE and the plurality of data lines DATA, respectively. In which, the display circuit 2 includes a switch 3 and a dot element 4 coupled to the switch 3. The switch 3 can be turned on or off according to a scan signal from the scan line GATE.

Figure 2:
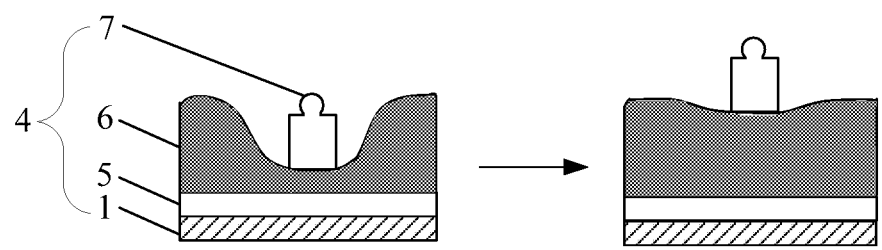
FIG. 2 illustrates an exemplary structural schematic diagram of a dot element in a display panel according to an embodiment of the present disclosure.

FIG. 2 illustrates an exemplary structural schematic diagram of a dot element 4 in the display panel as illustrated in FIG. 1. The dot element 4 includes a substrate 1, an electrode 5 provided on the substrate 1, a thermosensitive layer 6 provided on the electrode 5, and a dot key 7 arranged on the thermosensitive layer 6. In which, the electrode 5 is coupled to the switch 3, and may be applied with a data signal from the data line DATA when the switch 3 is turned on. The electrode 5 will be energized when being applied with the data signal from the data line DATA, thereby the thermosensitive layer 6 provided on the electrode 5 is heated. Based on the characteristics of the thermosensitive layer 6, the thermosensitive layer 6 has a soft texture when it is not heated, and the dot key 7 arranged on the thermosensitive layer 6 is recessed in the thermosensitive layer 6 due to its own gravity, and when the thermosensitive layer 6 is heated to a certain temperature, the texture of the thermosensitive layer 6 will become hardened from soft, which causes the dot key 7 to be lifted up and then protruded. By applying the scan signal and the data signal, the dot keys 7 at different positions can be protruded.

The display panel provided by the embodiment of the present disclosure may be a display panel displaying Braille characters. The six display circuits 2 illustrated in the dashed box in FIG. 1 are corresponding to one Braille character. By applying the scan signal and the data signal, the dot keys 7 in the display circuits 2 at different positions can be protruded, so that the display panel displays different Braille characters. Therefore, with the display panel provided in this embodiment, each dot key 7 can be independently controlled, so that the control is more precise and then the Braille information can be displayed more accurately.

In addition, in the display panel, since each dot key 7 can be independently controlled, the area occupied by the dot key 7 can be reduced within a reasonable range, thereby reducing the area occupied by the display circuit 2. Since six display circuits 2 are corresponding to one Braille character, such that the display panel can display more Braille characters per unit area. On the other hand, since the area occupied by a single Braille character is reduced, the size of the display panel can be reduced to a certain extent for the convenience of carriage and usage by the blind persons.

It can be understood that in the display panel, each dot element 4 can be regarded as a pixel unit, and the control of the dot key 7 included in each dot element 4 can be accurate to the level of pixel micrometer.

In the embodiment of the present disclosure, the thermosensitive layer 6 may be formed on a surface of the electrode 5 away from the substrate 1 by a coating process. In which, the thermosensitive layer 6 may be made of a thermosensitive material such as gel. Based on the characteristics of the thermosensitive material, the thermosensitive material has a soft texture when it is not heated, and the texture becomes hardened from soft when it is heated to a certain temperature threshold. It can be understood that different thermosensitive materials are corresponding to different temperature thresholds. Moreover, when different thermosensitive materials are heated to certain temperature thresholds, the time required for their textures to be hardened from soft are also different, i.e., the time from the application of the data signal to the electrode 5 to the raising of the dot key 7 are different. For example, the time from the application of the data signal to the electrode 5 to the raising of the dot key 7 may be one frame time.

Figure 3:
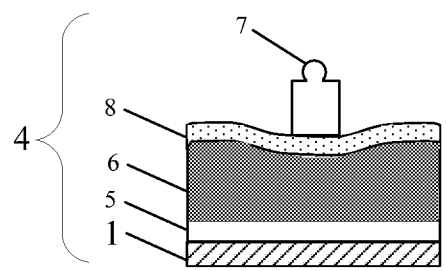
FIG. 3 illustrates another exemplary structural schematic diagram of a dot element in a display panel according to an embodiment of the present disclosure.

In addition, the blind person needs to sense the Braille information by means of finger touch. In order to prevent the thermosensitive layer 6 from being damaged by the long-time finger touch, in the embodiment of the present disclosure, as illustrated in FIG. 3, the dot element 4 further includes a protection layer 8, which may be arranged between the thermosensitive layer 6 and the dot key 7 to protect the thermosensitive layer 6. In an exemplary embodiment of the present disclosure, the protection layer 8 may be made of a resin material.

In the embodiment of the present disclosure, the dot elements 4 included in the display circuits 2 are arranged in a matrix. In general, one standard Braille character consists of a dot matrix of 2×3 dots, and each display circuit 2 represents different Braille characters by raising the dot keys 7 at different positions. Therefore, the applicability of the display panel is enhanced, and the blind persons are facilitated to touch and recognize the Braille information.

Figure 4:
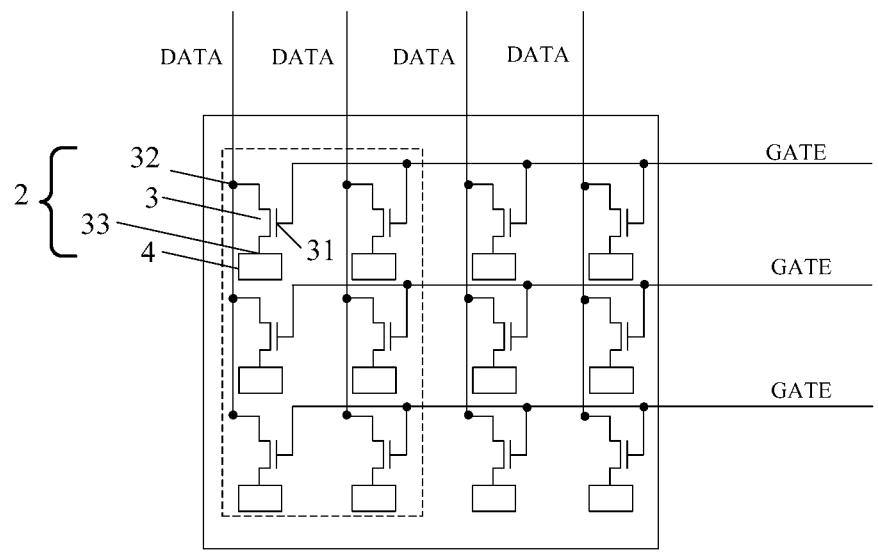
FIG. 4 illustrates a structural schematic diagram of a display panel according to another embodiment of the present disclosure.

In the embodiment of the present disclosure, as illustrated in FIG. 4, the switch 3 included in each display circuit 2 may be a thin film transistor, and it should be understood that other structure is also possible, which is not limited herein. In an exemplary embodiment of the present disclosure, a control electrode 31 of the thin film transistor is coupled to the scan line GATE, a first electrode 32 of the thin film transistor is coupled to the data line DATA, and a second electrode 33 of the thin film transistor is coupled to the electrode 5 in the dot element 4. A scan signal may be provided to the control electrode of the thin film transistor through the scan line GATE, so as to control the thin film transistor in the row to be turned on. A data signal is provided to the first electrode of the thin film transistor through the data line DATA, and transmitted to the electrode 5 through the second electrode of the thin film transistor, so that the electrode 5 is energized. The thermosensitive layer 6 corresponding to the electrode 5 starts to be heated, and when it is heated to a certain temperature, the texture of the thermosensitive layer 6 becomes hardened, so that the dot key 7 located above the thermosensitive layer 6 is protruded.

Figure 5:
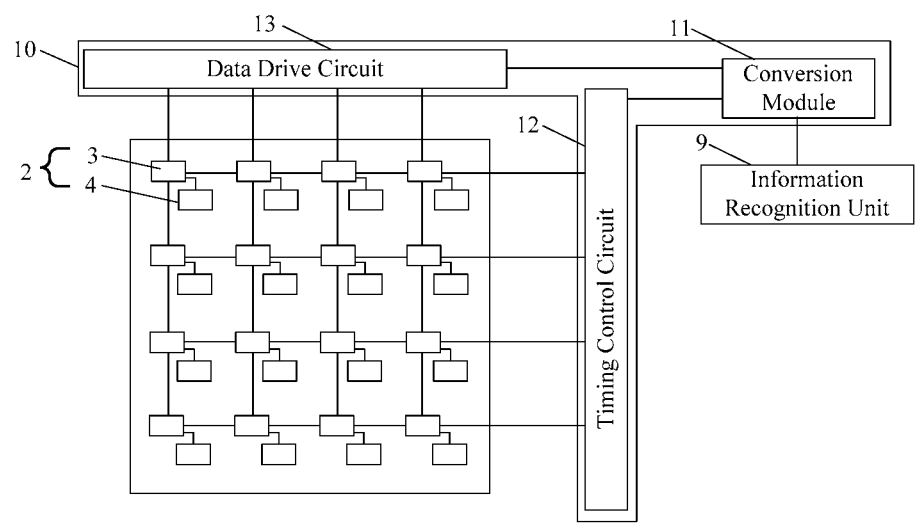
FIG. 5 illustrates a structural schematic diagram of a display device according to an embodiment of the present disclosure.

FIG. 5 illustrates a structural schematic diagram of a display device according to an embodiment of the present disclosure. As illustrated in FIG. 5, the display device includes the display panel illustrated in FIG. 1, an information recognition unit 9, and a control unit 10.

The information recognition unit 9 can recognize input information to generate text information. In the embodiment of the present disclosure, the input information may include at least one of image information and a voice information. In an exemplary embodiment of the present disclosure, the image information (such as road information) may be acquired by a camera in the display device, and the voice information may be acquired by a microphone (such as a mike) in the display device. The acquired image information may be provided to an image recognition element for recognition, and the acquired voice information may be provided to a voice recognition element for recognition to generate the text information.

The control unit 10 is coupled to the information recognition unit 9 and the display panel. The control unit 10 may convert the text information into Braille information, generate a drive signal for the display panel based on the Braille information, and provide the drive signal to the display panel. The display panel may display the Braille information according to the drive signal.

In the embodiment of the present disclosure, as illustrated in FIG. 5, the control unit 10 includes a conversion module 11, a timing control circuit 12, and a data drive circuit 13.

The conversion module 11 is coupled to the information recognition unit 9, the timing control circuit 12, and the data drive circuit 13, respectively. The conversion module 11 may convert the recognized text information into Braille information, determine the display circuit 2 in the display panel in which the corresponding dot key 7 is to be protruded based on the Braille information, and generate a first control instruction and a second control instruction. The first control instruction is related to the timing of the display circuit 2, and the second control instruction is related to the data of the display circuit 2.

The timing control circuit 12 is coupled to the conversion module 11 and the display panel. The timing control circuit 12 may generate a scan signal according to the first control instruction, and provide the scan signal to the corresponding scan line GATE of the display panel. In an exemplary embodiment of the present disclosure, the timing control circuit 12 may be coupled to the control electrode of the switch 3 included in the display circuit 2 through the scan line GATE. The control electrode may control the switch 3 to be turned on or off according to the scan signal.

The data drive circuit 13 is coupled to the conversion module 11 and the display panel. The data drive circuit 13 may generate a data signal according to the second control instruction, and provide the data signal to the corresponding data line DATA of the display panel. In an exemplary embodiment of the present disclosure, the data drive circuit 13 may be coupled to the first electrode of the switch 3 included in the display circuit 2 through the data line DATA. When the switch 3 is turned on, the data signal is transmitted to the corresponding electrode 5 through the second electrode of the switch 3, so that the electrode 5 is energized, and then the thermosensitive layer 6 provided on the electrode 5 is heated.

Figure 6:
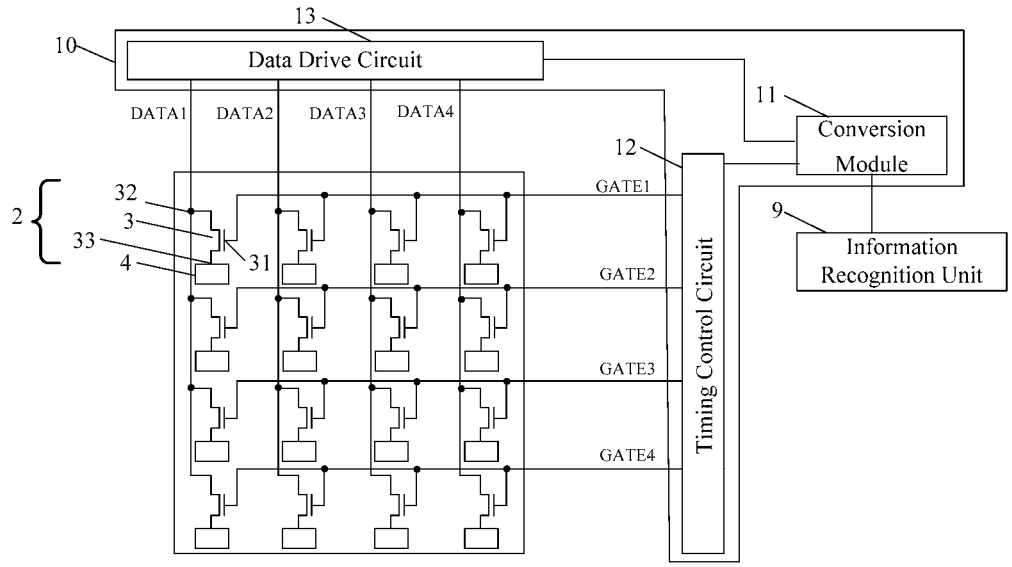
FIG. 6 illustrates a structural schematic diagram of a display device according to another embodiment of the present disclosure.

In the embodiment of the present disclosure, when the switch 3 included in the display circuit 2 is a thin film transistor, as illustrated in FIG. 6, the timing control circuit 12 is coupled to the control electrode 31 of the thin film transistor through the scan line GATE. The timing control circuit 12 provides the scan signal to the control electrode of the thin film transistor through the scan line GATE, so as to control the thin film transistor to be turned on. In an exemplary embodiment of the present disclosure, the timing control circuit 12 may control the thin film transistors included in the display circuits 2 to be turned on row by row.

As illustrated in FIG. 6, the data drive circuit 13 is coupled to the first electrode of the thin film transistor. When the thin film transistor is turned on, the data drive circuit 13 provides a data signal to the first electrode of the thin film transistor through the data line DATA, and the data signal is transmitted to corresponding electrode 5 through the second electrode of the thin film transistor, so that the electrode 5 is energized. The thermosensitive layer 6 corresponding to the electrode 5 starts to be heated, and when it is heated to a certain temperature, the texture of the thermosensitive layer 6 becomes hardened, so that the dot key 7 located above the thermosensitive layer 6 is protruded. In an exemplary embodiment of the present disclosure, the work principle of the control unit 10 is specifically described through an example in which the dot key 7 in the dot element 4 in the first row and the first column is controlled to be protruded, and the dot key 7 in the dot element 4 in the second row and the second column is controlled to be protruded.

Firstly, the timing control circuit 12 provides a scan signal to the control electrodes of thin film transistors in the first row through the scan line GATE1, and controls thin film transistors in first row to be turned on, the data drive circuit 13 provides a data signal to the first electrodes of thin film transistors in the first column through the data line DATA1, and the data signal is transmitted to the electrode 5 included in the dot element 4 in the first row and the first column through the second electrode of the thin film transistor, so that the electrode 5 is energized. The thermosensitive layer 6 corresponding to the electrode 5 starts to be heated, and when it is heated to a certain temperature, the texture of the thermosensitive layer 6 becomes hardened, so that the dot key 7 located above the thermosensitive layer 6 is protruded. That is to say, the dot key 7 in the dot element 4 in the first row and the first column is controlled to be protruded.

Next, the timing control circuit 12 provides a scan signal to the control electrodes of thin film transistors in the second row through the scan line GATE2, and controls thin film transistors in the second row to be turned on, the data drive circuit 13 provides a data signal to the first electrodes of thin film transistors in the second column through the data line DATA2, and the data signal is transmitted to the electrode 5 included in the dot element 4 in the second row and the second column through the second electrode of the thin film transistor, so that the electrode 5 is energized. The thermosensitive layer 6 corresponding to the electrode 5 starts to be heated, and when it is heated to a certain temperature, the texture of the thermosensitive layer 6 becomes hardened, so that the dot key 7 located above the thermosensitive layer 6 is protruded. That is to say, the dot key 7 in the dot element 4 in the second row and the second column is controlled to be protruded.

The display device provided in this embodiment can independently control each dot key 7, thereby achieving a more precise control, and displaying the Braille information more accurately. On the other hand, the display device further includes the information recognition unit 9 that recognizes the input information to generate text information, and the control unit 10 that converts the text information into Braille information, and then determines the display circuit 2 in the display panel in which the corresponding dot key is to be protruded based on the Braille information. Therefore, the display device provided in this embodiment can also convert the input information acquired from the outside into the Braille information, so that the blind person can better acquire the outside information.

Since each dot key 7 is independently controlled, the area occupied by the dot key 7 can be reduced within a reasonable range. On one hand, the display device can display more Braille characters per unit area, and on the other hand, the size of the display device can be reduced for the convenience of carriage and usage by the blind persons.

Figure 7:
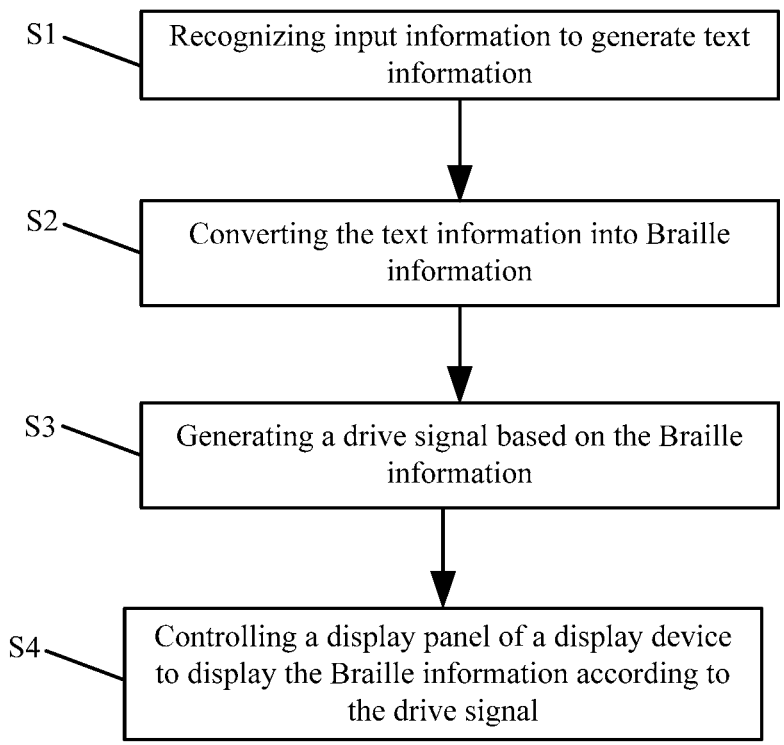
FIG. 7 illustrates a flow diagram of a method for displaying Braille information according to an embodiment of the present disclosure.

FIG. 7 is a flow diagram of a method for displaying Braille information according to an embodiment of the present disclosure. As illustrated in FIG. 7, the method for displaying Braille information can be applied to the display device described in the above embodiments. In step S1, input information is recognized to generate text information. In the embodiment of the present disclosure, the input information may include at least one of image information and voice information. In an exemplary embodiment of the present disclosure, the image information (such as road information) may be acquired by a camera, and the voice information may be acquired by a microphone (such as a mike). The acquired at least one of image information and voice information may be recognized to generate the text information.

In step S2, the text information is converted into Braille information.

Figure 8:
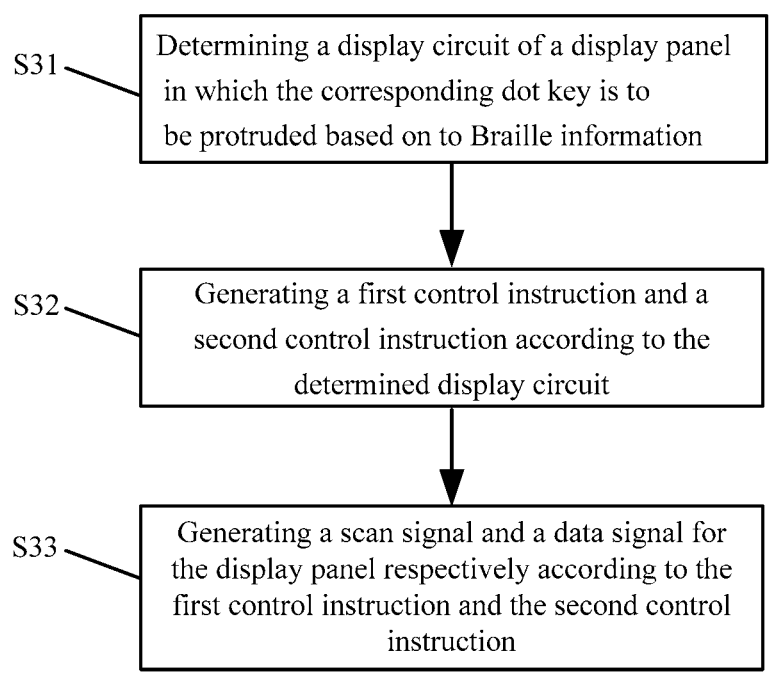
FIG. 8 illustrates a flow diagram of a drive signal generation process in the embodiment as illustrated in FIG. 7.

In step S3, a drive signal is generated based on the Braille information. In the embodiment of the present disclosure, the drive signal may include a scan signal and a data signal. In an exemplary embodiment of the present disclosure, FIG. 8 illustrates a flow diagram of a drive signal generation process. As illustrated in FIG. 8, in step S31, a display circuit of the display panel in which the corresponding dot key is to be protruded is determined based on the Braille information. In step S32, a first control instruction and a second control instruction are generated according to the determined display circuit. In step S33, a scan signal and a data signal for the display panel are generated respectively according to the first control instruction and the second control instruction.

In step S4, the display panel in the display device is driven to display the Braille information according to the drive signal. In an exemplary embodiment of the present disclosure, when the switch included in each display circuit of the display device is a thin film transistor, a scan signal is provided to the control electrode of corresponding thin film transistor by the scan line, so as to control the corresponding thin film transistor to be turned on. Next, a data signal for supplying power to the electrode is provided to the first electrode of the corresponding thin film transistor through the data line, and then transmitted to the corresponding electrode through the second electrode of the thin film transistor, so that the thermosensitive layer corresponding to the electrode is heated and hardened to control the corresponding dot key to be protruded.

With the method provided by the embodiment, on one hand, each dot key can be independently controlled, so that the control is more precise, and the Braille information can be displayed more accurately. On the other hand, the input information acquired from the outside can be converted into the Braille information, so that the blind person can better acquire the outside information.

The foregoing descriptions only concern specific embodiments of the present disclosure, while the protection scope of the present disclosure is not limited thereto. Any variation or substitution easily conceivable to those skilled in the art within the technical scope revealed by the present disclosure should fall within the protection scope of the present disclosure. Therefore, the protection scope of the present disclosure should be determined by the protection scope of the claims.

What is claimed is:

1. A display panel comprising:
    a plurality of scan lines;
    a plurality of data lines; and
    a plurality of display circuits arranged at intersections of the plurality of scan lines and the plurality of data lines, respectively;
    wherein the display circuit comprises:
        a switch configured to be turned on or off according to a scan signal from the scan line; and
        a dot element coupled to the switch, wherein the dot element comprises a substrate, an electrode provided on the substrate, a thermosensitive layer provided on the electrode, and a dot key arranged on the thermosensitive layer;
        wherein the electrode is coupled to the switch, and configured to be applied with a data signal from the data line when the switch is turned on;
    wherein the thermosensitive layer is configured to be heated by the electrode to protrude the dot key; and
    wherein the thermosensitive layer is made of a thermosensitive material, the thermosensitive material adapted to become harder when being heated.

2. The display panel according to claim 1, wherein the dot element further comprises a protection layer arranged between the thermosensitive layer and the dot key.

3. The display panel according to claim 2, wherein the protection layer is made of a resin material.

4. The display panel according to claim 1, wherein the plurality of display circuits is arranged in a matrix.

5. The display panel according to claim 1, wherein the switch comprises a thin film transistor (TFT), wherein a control electrode of the TFT is coupled to the scan line, wherein a first electrode of the TFT is coupled to the data line, and wherein a second electrode of the TFT is coupled to the electrode.

6. A display device comprising:
    a display panel according to claim 1;
    an information recognition unit configured to recognize input information to generate text information; and a control unit coupled to the information recognition unit and the display panel, and configured to convert the text information into Braille information to generate a drive signal for the display panel based on the Braille information, and to provide the drive signal to the display panel, wherein the display panel is configured to display the Braille information according to the drive signal.

7. The display device according to claim 6, wherein the control unit comprises:

a conversion module coupled to the information recognition unit, and configured to convert the text information into the Braille information to determine a display circuit of the display panel in which the corresponding dot key is to be protruded based on the Braille information, and to generate a first control instruction and a second control instruction;

a timing control circuit coupled to the conversion module and the display panel, and configured to generate a scan signal according to the first control instruction and provide the scan signal to the corresponding scan line of the display panel; and a data drive circuit coupled to the conversion module and the display panel, and configured to generate a data signal according to the second control instruction and provide the data signal to the corresponding data line of the display panel.

8. The display device according to claim 6, wherein the information recognition unit comprises at least one of an image recognition element and a voice recognition element.

9. A method for displaying Braille information in a display device according to claim 6, the method comprising:

recognizing the input information to generate the text information;

converting the text information into the Braille information;

generating the drive signal for the display panel of the display device according to the Braille information; and driving the display panel to display the Braille information according to the drive signal.

10. The method according to claim 9, wherein generating the drive signal for the display panel of the display device according to the Braille information comprises:

determining a display circuit of the display panel in which a dot key is to be protruded based on the Braille information;

generating a first control instruction and a second control instruction according to the determined display circuit; and generating a scan signal and a data signal for the display panel respectively according to the first control instruction and the second control instruction.

11. The method according to claim 9, wherein the input information comprises at least one of image information and voice information.

12. The method according to claim 9, wherein the control unit comprises:

a conversion module coupled to the information recognition unit, and configured to convert the text information into the Braille information to determine a display circuit of the display panel in which the corresponding dot key is to be protruded based on the Braille information, and to generate a first control instruction and a second control instruction;

a timing control circuit coupled to the conversion module and the display panel, and configured to generate a scan signal according to the first control instruction and provide the scan signal to the corresponding scan line of the display panel; and a data drive circuit coupled to the conversion module and the display panel, and configured to generate a data signal according to the second control instruction and provide the data signal to the corresponding data line of the display panel.

13. The method according to claim 9, wherein the information recognition unit comprises at least one of an image recognition element and a voice recognition element.

14. The display device according to claim 6, wherein the thermosensitive layer is made of a thermosensitive material.

15. The display device according to claim 6, wherein the dot element further comprises a protection layer arranged between the thermosensitive layer and the dot key.

16. The display device according to claim 15, wherein the protection layer is made of a resin material.

17. The display device according to claim 6, wherein the plurality of display circuits is arranged in a matrix.

18. The display device according to claim 6, wherein the switch comprises a thin film transistor (TFT), wherein a control electrode of the TFT is coupled to the scan line, wherein a first electrode of the TFT is coupled to the data line, and wherein a second electrode of the TFT is coupled to the electrode.

* * * * *